United States Patent
Daoud

[19]

[11] Patent Number: 5,550,916
[45] Date of Patent: Aug. 27, 1996

[54] TELECOMMUNICAATIONS EQUIPMENT TERMINAL

[75] Inventor: Bassel H. Daoud, Parsippany Township, Morris County, N.J.

[73] Assignee: Lucent Technologies Inc., Murray Hill, N.J.

[21] Appl. No.: 276,377

[22] Filed: Jul. 18, 1994

[51] Int. Cl.⁶ ..................................................... H04M 1/00
[52] U.S. Cl. ........................... 379/399; 379/413; 379/412
[58] Field of Search .................................... 379/399, 412, 379/387, 327, 328, 331, 332; 361/117, 118, 119, 124, 356

[56] References Cited

U.S. PATENT DOCUMENTS

| 3,870,490 | 3/1975 | Landy | 55/355 |
|---|---|---|---|
| 4,704,499 | 11/1987 | Faust . | |
| 4,710,846 | 12/1987 | Heisinger | 361/119 |
| 4,945,560 | 7/1990 | Collins et al. . | |
| 5,004,433 | 4/1991 | Daoud . | |
| 5,222,908 | 6/1993 | Baker, III et al. . | |
| 5,363,440 | 11/1994 | Daoud | 379/399 |

OTHER PUBLICATIONS

Daud U.S. patent application Ser. No. 08/040,772, filed Mar. 31, 1993 Cited in the specification for showing a network interface unit removably mounted over a protector unit.

Primary Examiner—Jeffery Hofsass
Assistant Examiner—Jacques M. Saint-Surin
Attorney, Agent, or Firm—Lester H. Brinbaum

[57] ABSTRACT

Disclosed is a telecommunications equipment terminal for outdoor mounting. The terminal housing includes a removable hood which reveals a top surface including sealing means around the periphery thereof and appropriate apertures to permit the terminal to be vertically stacked with another terminal of the same type.

10 Claims, 2 Drawing Sheets

TELECOMMUNICAATIONS EQUIPMENT TERMINAL

BACKGROUND OF THE INVENTION

This invention relates to telecommunications apparatus such as network interface units and building entrance protector units.

Network interface units constitute the demarcation between the customer's equipment and the telephone network. In buildings including multiple subscribers, the interface unit is typically mounted in a basement and includes an array of customer bridges, each bridge being coupled to an individual subscriber line. The bridges are coupled to the phone network through an RJ11 jack and plug so that the customer can plug a working phone into the jack to deteermine if any problems lie in the customer or network side of the telecommunications system.

Network interface units typically also include a building entrance protector portion which comprises a cable splice chamber and a protector field for providing surge protection for each customer. Such units usually require a large amount of wall space, which may not be readily available, especially if additional units are required to increase capacity.

It has recently been suggested that the network interface unit can be removably mounted over the protector unit. (See U.S. patent application of Daoud, Ser. No. 08/040,772, filed Mar. 31, 1993 and assigned to the present assignee.) It has also been suggested that network interface and protector units can be stacked in a vertical direction. (See, U.S. Pat. No. 4,945,560 issued to Collins et at.)

In many instances it is desired to mount network interface and protection units outdoors. It is also desirable to be able to stack the units vertically to increase the capacity of the units. However, it is difficult in such instances to provide sufficient protection for the units from the outdoor elements.

SUMMARY OF THE INVENTION

The invention is telecommunications apparatus including a housing for mounting outdoors. The housing includes a top surface and a cover removably mounted thereon. The top surface includes a sealing material around the periphery thereof and at least one aperture which permits a cable to pass therethrough. The top surface thereby provides a sealed interface with a bottom surface of another housing of the same type.

BRIEF DESCRIPTION OF THE DRAWING

These and other features of the invention are delineated in detail in the following description. In the drawing.

It will be appreciated that, for purposes of illustration, these figures are not necessarily drawn to scale.

DETAILED DESCRIPTION

Figure 1:
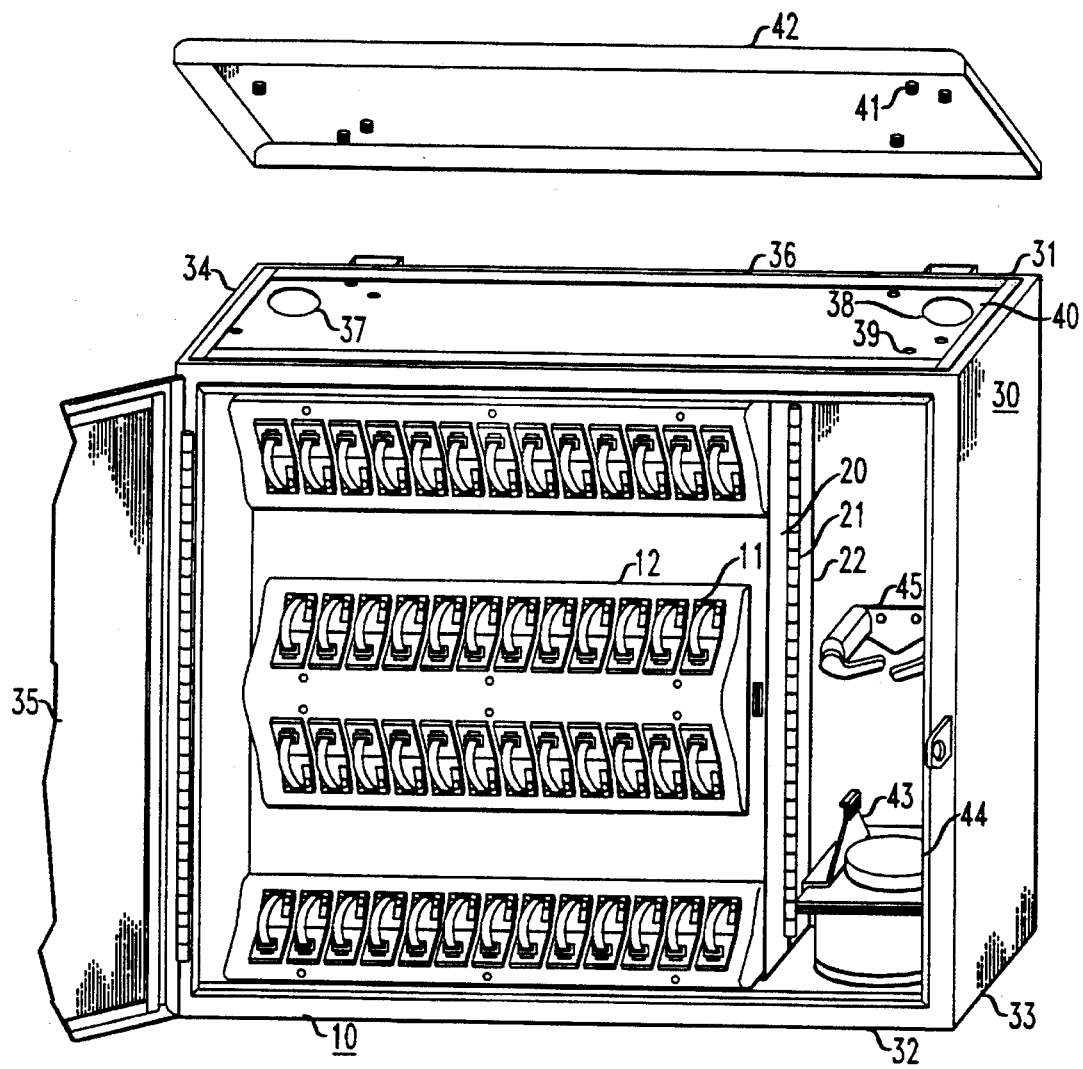
FIG. 1 is a perspective view of a network interface and protector unit in accordance with an embodiment of the invention.

For purposes of illustration, a network interface unit, 10, is shown in FIG. 1. It should be appreciated that the invention is applicable to other telecommunications equipment which is to be mounted outdoors.

Figure 2:
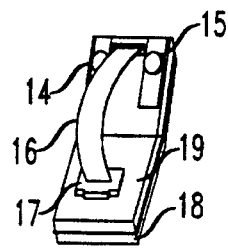
FIG. 2 is an enlarged view of a portion of the same apparatus.

The network interface unit 10 includes an array of customer bridges, e.g., 11, mounted within respective holes in a chassis 12. As shown in FIG. 2, each bridge includes a connector portion 13, which comprises a pair of screws, 14 and 15, electrically coupled to the customer's equipment by means of wires (not shown). The screws 14 and 15 are also electrically coupled to a pair of wires (not shown) formed within a protective jacket 16, which emerges from the body of the connector 13. The wires terminate in a standard RJ11 plug 17. (For an example of a connector unit which may be used in a network interface unit, see U.S. Pat. No. 5,004,433 issued to Daoud.)

Adjacent to each connector portion 13 is a bridge assembly 18 which includes a jack 19 for receiving the RJ11 plug 17. The bridge assembly is electrically coupled to the telecommunications network through standard wiring and electrical connectors, and can include additional components such as a maintenance termination unit. (For an example of a bridge assembly, see U.S. Pat. No. 5,222,908 issued to Baker et at.)

The chassis 12 can be secured to a base member 20 which, in turn, is mounted by means of a hinged member 21 to a building entrance protector module 22. As described in more detail in U.S. patent application Ser. No. 08/040,772, filed Mar. 31, 1993, and incorporated by reference herein, the protector module includes an array of protector devices electrically coupled to a bundle of wires which terminates in a splice connector for allowing electrical connection to the incoming cable.

The interface unit 10 is mounted within a housing 30 by means of fasteners such as screws (not shown). The housing 30 includes top and bottom surfaces, 31 and 32, respectively, and opposite side surfaces 33 and 34. Mounted by means of hinges to an edge of one of the side surfaces (e.g., 34) is a front cover element, 35, a portion of which is shown in an open position in FIGS. 1 and 3.

The top surface 31 includes a strip of sealing material 36 around the periphery thereof. The sealing material can be, for example, close cell neoprene foam rubber. Within the confines of the sealing material 36 are a pair of large apertures, 37 and 38, and an array (in this example six) of relatively smaller apertures, e.g. 39.

The large apertures 37 and 38 include therein plugs of foam rubber, e.g., 40, with central openings for permitting telephone cables (not shown) to pass through the apertures. The plugs of rubber can be of the type shown, for example, in U.S. Pat. No. 4,704,499 issued to Faust, which provide a good seal between the cables and the apertures 37 and 38.

The small apertures, e.g., 39, are sized and placed to receive corresponding studs, e.g., 41, which protrude from the bottom surface of a cover 42 when the cover is placed over the top surface 31 of the housing 30. Fasteners such as wing-nuts (not shown) can then be tightened around the studs from the inside of the housing 30 to secure the cover 42 to the housing. The cover extends beyond the front, back, and side surfaces of the housing to prevent precipitation from entering the housing. It will be appreciated that the cover 42 may be easily removed for stacking as described below by loosening the fasteners.

Within the housing 30, there is also included a strain relief bracket 43 which surrounds a rubber seal 44 similar to seal 40. A cable guide member 45 is mounted above the bracket 43.

Figure 3:
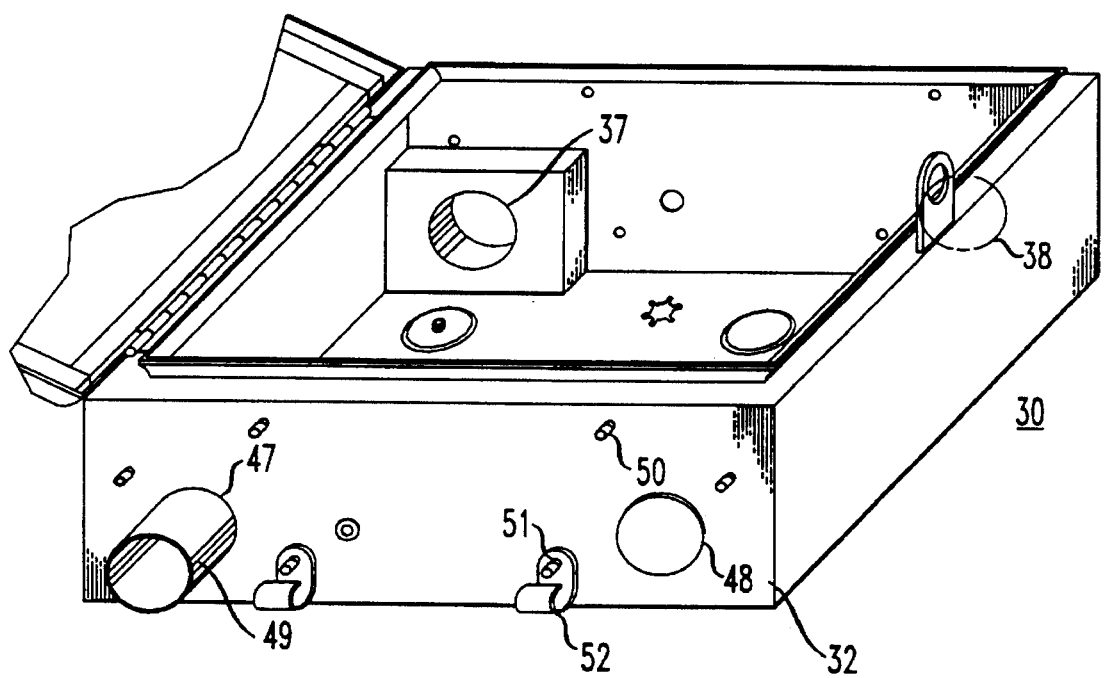
FIG. 3 is a perspective bottom view of the same apparatus.

The bottom surface 32 of the housing 30 can best be understood by inspection of the view of FIG. 3 where the network interface unit 10 has been removed for illustrative purposes. The surface 32 also includes two large apertures, 47 and 48, which are positioned opposite to respective large apertures, 37 and 38, in the top surface 31. Surrounding one large aperture, 47, is a cylindrical member 49 which extends from the bottom surface. The bottom surface 32 further includes an array of studs, e.g., 50 and 51, which are in the same pattern as the studs, e.g., 41, on the top cover 42. Selected studs, e.g., 51, also include cable rings, e.g., 52, secured thereto.

It will be appreciated that when the unit of FIGS. 1 and 3 is in a standalone mode, the top cover element 42 will be securely mounted to the top surface 31 by means of the studs, e.g., 41, extending from the top cover element. A cable (not shown) coupled to the telecommunications network will extend through cylindrical element 49 and aperture 47 and be sealed by a standard spiral tubing (not shown) which is sold, for example, by the 3M Company under the designation cold shrink tubing. The wires in the cable will be coupled to the protector unit 22 by a standard splice connector. (See, e.g., U.S. patent application of Daoud cited supra.) An output cable (not shown), coupled to the end user's equipment will extend through aperture 48 and will be held in place within the housing 30 by the strain relief bracket 43 and cable guide 45.

When it is desired to stack another unit with an identical housing on top of that shown in FIGS. 1 and 3, the top cover element 42 is completely removed. The additional unit will have elements corresponding to those on the bottom surface 32 of the unit shown. Thus, the bottom surface of the additional unit will be placed so that the element corresponding to the cylindrical element 49 is inserted through the large aperture 37 on the top surface of housing 30, and the studs on the bottom of the additional unit (e.g., corresponding to 50 and 51 ) are inserted into the respective smaller apertures, e.g, 39, on the top surface of housing 30. Fasteners, such as wing-nuts are then used on the studs to secure the additional unit to the top surface of the unit of FIGS. 1 and 3. The input cable will then be placed to extend through apertures 47 and 37 into the additional unit, while the output cable will extend through apertures 48 and 38 into the additional unit for electrical connection therewith.

The mated surfaces of the two units will be sealed from the outside environment by the strip 36. Additional protection against precipitation entering the housing 30 will be provided by the sealing material, e.g., 40, in the larger apertures. The additional unit will have a top cover element corresponding to element 42 to protect the top surface of the additional unit. That cover will also be removable to allow stacking of a still further unit.

Various modifications of the invention will become apparent to those skilled in the art. All such variations which basically rely on the teachings through which the invention has advanced the art are properly considered within the scope of the invention.

I claim:

1. Apparatus comprising:

telecommunications equipment; and a housing for mounting said equipment outdoors, said housing comprising a top surface with a removably mounted cover thereon, said top surface including a sealing material around a periphery thereof and at least one aperture which permits a telecommunications cable to pass therethrough, the top surface thereby providing a sealed interface with a bottom surface of another housing of a similar type when the cover is removed.

2. Apparatus according to claim 1 wherein the housing further comprises a bottom surface including a plurality of studs extending therefrom.

3. Apparatus according to claim 2, wherein the bottom surface further comprises a cylindrical member extending therefrom and surrounding an aperture in the bottom surface, such that the cylindrical member and studs can be inserted into corresponding apertures in a top surface of another housing of a similar type.

4. Apparatus according to claim 1 wherein the sealing material comprises a strip of close cell neoprene foam rubber.

5. Apparatus according to claim 1 wherein the telecommunications equipment comprises a network interface unit.

6. Apparatus according to claim 5 wherein the telecommunications equipment further comprises a building entrance protector unit.

7. Apparatus according to claim 1 wherein the aperture includes an additional sealing material therein.

8. Apparatus according to claim 3 wherein the apertures on the top and bottom surfaces are aligned to permit a cable to pass through the housing.

9. Apparatus according to claim 8 wherein the top and bottom surfaces each include additional apertures which are aligned to permit an additional cable to pass through the housing.

10. Apparatus according to claim 1 wherein the top surface further includes an array of holes which are placed to receive studs extending from the cover and from a bottom surface of a housing of a similar type.

\* \* \* \* \*